(12) United States Patent
Kopelman et al.

(10) Patent No.: US 7,373,317 B1
(45) Date of Patent: May 13, 2008

(54) METHOD AND APPARATUS FOR FACILITATING SALES OF GOODS BY INDEPENDENT PARTIES

(75) Inventors: Joshua M. Kopelman, Wynnewood, PA (US); Srinivas Balijepalli, Devon, PA (US)

(73) Assignee: eBay, Inc., San Jose, CA (US)

( * ) Notice: Subject to any disclaimer, the term of this patent is extended or adjusted under 35 U.S.C. 154(b) by 0 days.

(21) Appl. No.: 09/427,958

(22) Filed: Oct. 27, 1999

(51) Int. Cl.
 G06Q 30/00 (2006.01)
(52) U.S. Cl. ....................................................... 705/27
(58) Field of Classification Search .................. 705/26, 705/27, 37
 See application file for complete search history.

(56) References Cited

U.S. PATENT DOCUMENTS

| | | | |
|---|---|---|---|
| 4,613,946 A | 9/1986 | Forman | 364/518 |
| 4,799,156 A | 1/1989 | Shavit et al. | 705/26 |
| 5,592,375 A | 1/1997 | Salmon et al. | 395/207 |
| 5,664,111 A | 9/1997 | Nahan et al. | |
| 5,715,402 A | 2/1998 | Popolo | 395/237 |
| 5,732,400 A | 3/1998 | Mandler et al. | |
| 5,790,790 A | 8/1998 | Smith et al. | 395/200.36 |
| 5,797,127 A | 8/1998 | Walker et al. | |
| 5,825,881 A | 10/1998 | Colvin | |
| 5,842,199 A | 11/1998 | Miller et al. | |
| 5,845,265 A * | 12/1998 | Woolston | 705/37 |
| 5,897,622 A | 4/1999 | Blinn et al. | |
| 5,950,178 A | 9/1999 | Borgato | 705/37 |
| 5,960,411 A | 9/1999 | Hartman et al. | |
| 6,012,045 A | 1/2000 | Barzilai et al. | |
| 6,016,475 A | 1/2000 | Miller et al. | |
| 6,016,504 A | 1/2000 | Arnold et al. | |
| 6,029,141 A | 2/2000 | Bezos et al. | |
| 6,047,264 A | 4/2000 | Fisher et al. | 705/26 |
| 6,055,513 A | 4/2000 | Katz et al. | |

(Continued)

FOREIGN PATENT DOCUMENTS

GB 1489572 A * 10/1977

(Continued)

OTHER PUBLICATIONS

Storefront Development Corporation, at Mothers' Online Thrift Shop (http://www.motshop.com) (excerpts printed Jun. 17-19, 2000).

(Continued)

*Primary Examiner*—Gerald J. O'Connor
(74) *Attorney, Agent, or Firm*—Synnestvedt & Lechner LLP

(57) ABSTRACT

A method for facilitating sales of goods of independent sellers. The method involves receiving a standard identification code, such as a UPC or ISBN code, of readily identifiable goods. The standard identification code is transmitted by a seller to a third-party marketeer who adds the good to its virtual inventory of goods for sale. The marketeer then presents the independent sellers' goods for sale to buyers shopping in the marketeer's marketplace. The marketeer need not take actual possession of the goods, yet the marketeer may properly present the goods for sale because the characteristics of the good identified by the standard identification code are known. The marketeer may set a price for the goods, e.g. as a function of a competing vendor's price for a comparable good having the same standard identification code.

31 Claims, 4 Drawing Sheets

U.S. PATENT DOCUMENTS

| | | | |
|---|---|---|---|
| 6,061,448 A | 5/2000 | Smith et al. | 380/21 |
| 6,064,979 A * | 5/2000 | Perkowski | 705/26 |
| 6,076,070 A * | 6/2000 | Stack | 705/20 |
| 6,085,176 A | 7/2000 | Woolston | 705/37 |
| 6,101,484 A | 8/2000 | Halbert et al. | |
| 6,108,493 A | 8/2000 | Miller et al. | |
| 6,119,101 A | 9/2000 | Peckover | |
| 6,119,137 A | 9/2000 | Smith et al. | 707/523 |
| 6,154,738 A * | 11/2000 | Call | 707/4 |
| 6,178,408 B1 | 1/2001 | Copple et al. | 705/14 |
| 6,192,407 B1 | 2/2001 | Smith et al. | 709/229 |
| 6,202,051 B1 | 3/2001 | Woolston | 705/27 |
| 6,243,691 B1 | 6/2001 | Fisher et al. | 705/37 |
| 6,308,168 B1 | 10/2001 | Dovich et al. | |
| 6,321,221 B1 | 11/2001 | Bieganski | |
| 6,334,127 B1 | 12/2001 | Bieganski et al. | |
| 6,356,879 B2 | 3/2002 | Aggarwal et al. | |
| 6,412,012 B1 | 6/2002 | Bieganski et al. | |
| 6,415,269 B1 | 7/2002 | Dinwoodie | 705/37 |
| 6,625,581 B1 * | 9/2003 | Perkowski | 705/27 |

FOREIGN PATENT DOCUMENTS

| | | |
|---|---|---|
| WO | WO 99/07121 | 11/1999 |

OTHER PUBLICATIONS

Excerpt of document titled "Method for Buying and Selling Merchandise In A Network Of Users", a document alleged to have been filed as a patent application around Jun. 1999.

BookPriceCompare.com—Coupons and discounts. [online] [Retrieved on Jul. 8, 2002] Retrieved from the Internet using <URL http://www.bookpricecompare.com/bin/search.cgi?find=Compare &A_0618037667=1 (1 p.).

eBayListings: Action & Adventure. [online] [Retrieved on Jul. 8, 2002] Retrieved from the Internet using <URL http://listings.ebay.com/aw/plistings/list/all category271/index.html?ssPageName=bookhubactionadventure (4 pp.).

Amazon.com: Books [online] [Retrieved on Jul. 8, 2002] Retrieved from the Internet using <URL http://www.amazon.com/exec/obidos/tg/browse/-/283155/ref=tab_gw_b_3/102-9150031-1671331 (3 pp.).

Priceline.com—Name your own price and save on airline tickets, hotel rooms, new cars, home mortgages . . . [online] [Retrieved on Jul. 8, 2002] Retrieved from the Internet using <URLhttp://www.priceline.com/customerservice/faq/howitworks/howitworks.asp?session_key=D10011AC230011.(2 pp).

* cited by examiner

STANDARD IDENTIFICATION CODE (E.G. UNIVERSAL PRODUCT CODE ("UPC CODE") OR INTERNATIONAL STANDARD BOOK NUMBER ("ISBN CODE"))

Figure 4

METHOD AND APPARATUS FOR FACILITATING SALES OF GOODS BY INDEPENDENT PARTIES

FIELD OF THE INVENTION

This invention relates generally to the field of pricing goods for sale and particularly to a method and apparatus for pricing and selling goods in electronic commerce applications using communications networks.

BACKGROUND OF THE INVENTION

The industrial age has given rise to a global economy of factories engaged in mass production of various goods. An enormous amount of commerce is transacted in the buying and selling of such goods. While some such goods lose their value with use, e.g., food products, many such goods retain a substantial portion of their value even after use or ownership by another. Such goods are referred to herein as "durable". A considerable amount of commerce is transacted in the buying and selling of durable goods, particularly used durable goods.

Almost all durable goods are readily identifiable by a standard unique identification code ("ID code"), particularly those that are mass produced. In the case of computer software, music cassettes or compact discs, videocassettes and digital video discs, the ID code may be a human readable Universal Product Code ("UPC"), a thirteen digit ID code that readily identifies the good. In the case of books, magazines or other publications, the ID code may be a ten-digit International Standard Book Number ("ISBN"). Other items are more readily identified by a manufacturer or brand name and a model number, as for baseball cards and consumer electronics, e.g., a Sony® KV-3620 television. Some goods may be identified by more than one type of ID code.

Many durable and readily identifiable goods are fungible items that derive their value substantially from their common characteristics. For example, a single signed copy of Michael Jackson's album titled "Thriller" and recorded on a compact disc ("CD") derives much of its value because it is signed by the performance artist. Such a CD is unique and therefore is not a fungible good. In contrast, an unsigned copy of Michael Jackson's "Thriller" CD derives substantially all of its value because of the songs recorded thereon. Therefore, all such CD's have substantially the same value to consumers. Such CD's are therefore fungible.

Auctions provide one type of marketplace for selling goods. Used goods sold at auction are sold at prices set by interested buyers. An auctioneer facilitates sale transactions without the need to maintain goods in inventory. Auctions are particularly good for sellers to insure a highest possible sale price, especially for unique, non-fungible items. However, determining and ensuring a fair price is difficult for buyers. Buyers must have a high degree of knowledge to determine whether a price for a certain good is fair.

Retail selling also provides a marketplace for sale of goods. Used goods sold at retail are sold at prices set by a seller. Retail selling is advantageous to the seller because it allows the seller to control the price of the good. However, it requires the seller to maintain a large inventory of goods, which is expensive and disadvantageous. Competition, particularly for fungible goods, drives prices downward which is advantageous to the buyer. The seller must have a high degree of knowledge to ensure that his price is competitive. In addition, a price for a good may be fair to the buyer when set by the seller, but may no longer be fair if market conditions change after the price is set and before the buyer purchases the good.

Electronic commerce, or Internet-based sales are common and have problems similar to retail. Numerous online auctions may be found. An example of such an online auction is held by eBay Inc. of San Jose, Calif., at www.ebay.com. Such auctions are better suited to unique goods but are also used for fungible goods. However, "bidding wars" between buyers can lead to high prices for such goods, whether new or used.

Retail type sales are also conducted at numerous online websites, such as www.amazon.com. Online retail selling is also disadvantageous because it requires the seller to maintain a substantial inventory of goods. A reverse-auction system, where a seller may accept a price set by a buyer is provided on the worldwide web at www.priceline.com by priceline.com Inc. of Stamford, Conn. U.S. Pat. No. 5,797,127 to Walker et al. discloses a reverse auction method, apparatus and program for pricing, selling and exercising options to purchase airline tickets.

For electronic commerce applications, software-implemented shopping agents are well known. Using a shopping agent, a buyer can identify vendors and prices for a good. One type of shopping agent queries multiple vendor's websites to determine a best price or list of prices. For example Cendant Corp. of New York, N.Y. is a retail seller of new books which provides access to such a shopping agent on the worldwide web at www.books.com. Books.com uses a pricing agent ("Price Compare") to price items it sells and holds in its inventory. It uses the shopping agent to query several competitors and, if its price for a new book is not less than its competitors' prices, the pricing agent sets the price for its new book at less than the lowest competitor's price for the same new book. However, the seller still controls the price since it determines the method used by its pricing agent to set the price. In addition, the seller is required to maintain a substantial inventory of books.

Until now, there has been no acceptable way to facilitate sales of goods which ensures fair pricing while eliminating the need for inventory and minimizing pricing burdens on the buyer and the seller. In addition there is no acceptable way to exploit the fungible nature of durable goods.

Accordingly, it is an object of the present invention to provide a method for facilitating pricing and sales of goods.

It is another object of the present invention to provide a method which does not require maintenance of an inventory of goods.

It is yet another object of the present invention to provide a method for pricing goods for sale by independent sellers.

It is a further object of the present invention to ensure lowest pricing of goods which exploits the fungible nature of goods.

It is yet a further object of the present invention to exploit the fungible nature of used durable goods to price goods.

It is yet a further object of the present invention to derive a price for an independent seller's good as a function of a third party's price for a similar good.

It is yet a further object of the present invention to provide an apparatus for facilitating sales and pricing of goods.

It is yet a further object of the present invention to provide a computer-implemented method for facilitating sales and pricing of goods.

SUMMARY OF THE INVENTION

The invention provides a method for facilitating sales and pricing of goods by removing direct price control from the buyer and the seller. The invention automates the pricing process by deriving a sale price from a third party's index price using a method set by either the seller or an intermediary, referred to herein as the "marketeer". A current index price is determined by reference to a party other than the buyer or seller at a time of listing the good for sale or at a time of the sale. An appealing price for an item may be ensured by using a lowest price of a group of vendors for a comparable good as the index price and deriving a discounted sale price from the index price. The readily identifiable, fungible nature of durable goods is exploited by the sellers to identify used goods to the marketeer using a standard ID code. The good is never received for sale by the marketeer yet its characteristics are known. The marketeer exploits the nature of such goods when determining the index price for a new good and when pricing a used good by deriving from the index price a sale price representing a discount to the buyer for a used good having essentially the same value as a new good.

A computer-implemented method for pricing an independent seller's good using a marketeer controller is also provided. The marketeer controller is capable of communicating with a buyer interface and a seller interface via a communications network, the marketeer controller including a CPU and a memory operatively connected to the CPU. The marketeer controller stores in its memory a program executable by the CPU for deriving a sale price of the good. The computer-implemented method comprises the steps of: receiving from the buyer via the communications network, an expression of interest in purchasing the good; querying a vendor's controller to determine the vendor's price of a comparable good; and executing the program to derive the sale price of the good using a predetermined method.

A marketeer controller for processing data for pricing an independent seller's good in accordance with the present invention is also provided. The marketeer controller comprises: a central processing unit (CPU) for executing programs; a memory operatively connected to the CPU; a network interface device operatively connected to the CPU for communicating with a seller interface and a vendor's controller via a communications network; a first program stored in the memory for receiving identification code data from the seller to identify a good and for storing the data; a second program stored in the memory for receiving data from a buyer representing the buyer's interest in purchasing the good; a shopping agent program stored in the memory for querying a vendor's controller to determine the vendor's price of a comparable good similar to the seller's good and for determining an index price as a function of the vendor's price and a pricing agent program stored in the memory for deriving a sale price of the good from the index price using a predetermined method.

A non-computer-implemented method for pricing an independent seller's good also is provided.

DESCRIPTION OF THE DRAWINGS

FIG. 4 is a block diagram of a standard identification code.

DETAILED DESCRIPTION

The present invention provides a method and apparatus for facilitating sales between buyers and sellers and pricing goods for sale. A marketeer facilitates sales and pricing of the sellers' goods. In one embodiment an index price is obtained from a third party at a time proximate to the time the buyer wishes to buy the good. In the preferred embodiment, the index price is obtained from a third party at a time proximate to the time the seller registers the good with the marketeer as a good for sale by the seller. The seller agrees, before the sale, to sell his good at a sale price determined by the marketeer using an index price as a reference. The seller may specify a method for deriving the sale price as a function of the index price. Alternatively, the marketeer may specify the method. In alternate embodiments, the seller is presented with additional alternative options for pricing the seller's good, e.g., to specify a fixed price, or to specify a discount from a suggested retail price, i.e., a "list" or "cover" price instead of deriving a price from an index price. The marketeer may optionally store a database of suggested retail prices.

Figure 1:
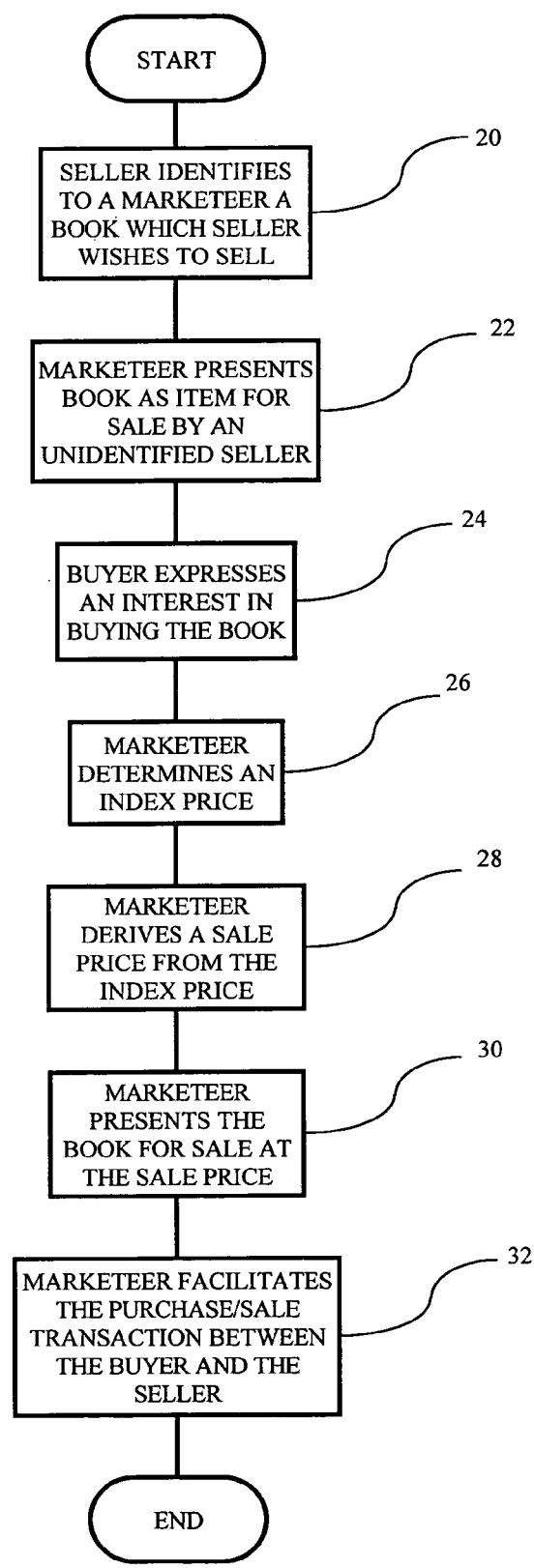
FIG. 1 is a flow diagram providing an example of a transaction in accordance with the present invention.

FIG. 1 is a flow diagram providing an example of a transaction in accordance with the present invention in which the index price is determined at or near the time of the sale. By way of example, the invention will be discussed below in the contexts of sale of a used paperback copy of Sue Grafton's book titled "A is for Alibi". First, a seller identifies ("registers") his book for sale with the marketeer as shown at step 20. The marketeer does not take possession of the book for inventory purposes but rather registers the book as an item for sale. The marketeer presents the book in a marketplace as an item for sale by an undisclosed seller, as shown at step 22. If the method is computer-implemented, the marketplace may be a website and the book may be presented using images and/or text retrieved from an existing database—such information need not be provided by the seller. To a buyer, it may appear that the book is being offered for sale by the marketeer. In an alternate embodiment, the marketplace could be a conventional type storefront including a booth or kiosk presenting a printed catalog or brochure depicting goods, and/or product samples representing goods for sale.

Figure 2:
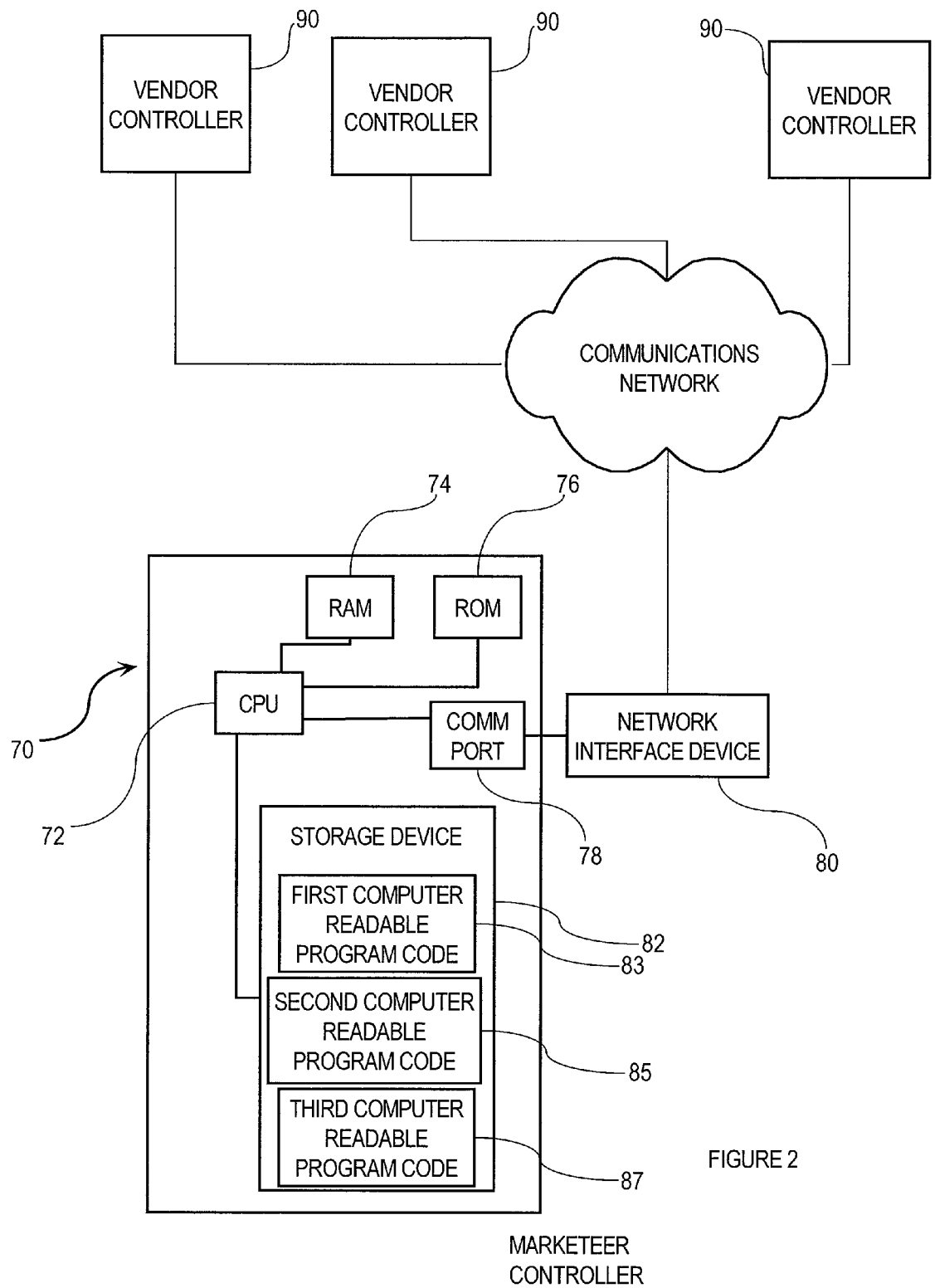
FIG. 2 is a block diagram of a marketeer controller and multiple vendor controllers in accordance with the present invention.

The buyer may browse the marketplace and the goods presented for sale by the marketeer. When the buyer expresses an interest in a book, the marketeer determines an index price for the book, as shown at steps 24 and 26. In one embodiment, the index price is an independent third party's price for a comparable good, preferably a new book, if the seller is offering a used book. In an alternate embodiment, the index price is the lowest price among a group of independent third parties' prices for the comparable good. If the method is computer-implemented, the index price may be determined by querying a third party vendor's computer or web server 90 ("controller", as shown in FIG. 2), e.g., using a standard product identification code such as a universal product code ("UPC") or International Standard Book Number ("ISBN"). For example, the marketeer could query amazon.com to determine that amazon.com is selling a new paperback copy of "A is for Alibi" for $10 and set the index price to $10. Determining an index price proximate the time of sale to the buyer ensures a fair or lowest price for the good relative to other vendors' prices.

The marketeer then derives a sale price from the index price, as shown at step 28. In one embodiment, the method for deriving the price is determined by the marketeer. In another embodiment, the method for deriving the price is specified by the seller at the time the seller presents the good to the marketeer for sale. For example, the method may represent a discount from the index price, e.g., a 50% discount from the index price. In this example, the marketeer derives a sale price of $5 for the seller's used book by applying a 50% discount to amazon.com's price of $10 for a new paperback copy of "A is for Alibi". This ensures that the sale price is fair, in one embodiment, or the lowest price, in another embodiment. The marketeer then presents the book for sale to the buyer at the sale price. If the buyer decides to buy the book at the sale price, the marketeer facilitates the purchase/sale transaction between the buyer and the seller, as shown at step 30 and 32. The marketeer may facilitate the sale, for example, by identifying the buyer to the seller and the seller to the buyer and permitting the buyer and seller to complete the transaction. Alternatively, the marketeer may facilitate the same by referring the parties to a third party intermediary acting as a clearinghouse for the transaction, or by acting as the clearinghouse itself. When the marketeer acts as the clearinghouse, it receives only sold goods and therefore has no inventory in the traditional sense. In the preferred embodiment, the marketeer is compensated for facilitating the transaction.

It should be appreciated that such a transaction may be implemented in a variety of ways. For example, all communications between the buyer, seller, marketeer, and vendors could be made between humans by telephone. However, in the preferred embodiment, the inventive method is software-implemented in an electronic commerce application and all communications are transmitted electronically between computers communicating via a communications network.

In the preferred embodiment, the marketeer provides an electronic marketplace, e.g., a website, wherein sellers of goods can register their goods with the marketeer for sale. The website is accessible to buyers and sellers via a communications network, such as the Internet. Buyers and sellers can communicate with the marketeer, or its marketeer controller, e.g., a web server, using an interface and interface software. For example, the buyer and seller interface may each comprise a personal computer running standard web browser software and having network access capability, as is known in the art.

FIG. 2 is a block diagram of a marketeer controller 70 in accordance with the present invention. The marketeer controller also includes a central processing unit ("CPU") 72, random access memory ("RAM") 74, read only memory ("ROM") 76, and a communications port ("COMM PORT") 78 connected to a network interface device 80 for communicating over a communications network. The marketeer controller 70 also includes a storage memory including a storage device 82 for storing data including computer readable program code 83, 85, 87 for receiving identification code data from a seller to identify a good presented for sale by a seller, for receiving data representing a buyer's interest in purchasing a good, for identifying an index price, for deriving a sale price and other data required to complete sale transactions, e.g. buyer's and sellers identity or contact information, information representing seller's selection of a method for deriving a price, etc.

The marketeer controller is interconnected with or interconnectable to buyer and seller interfaces (i.e., computers running standard web browser software) via a communications network such that information can be transmitted back and forth between the buyer and seller interfaces and the marketeer controller and such that the marketeer controller can transmit information back and forth between third party vendors' computers (not shown).

Figure 3:
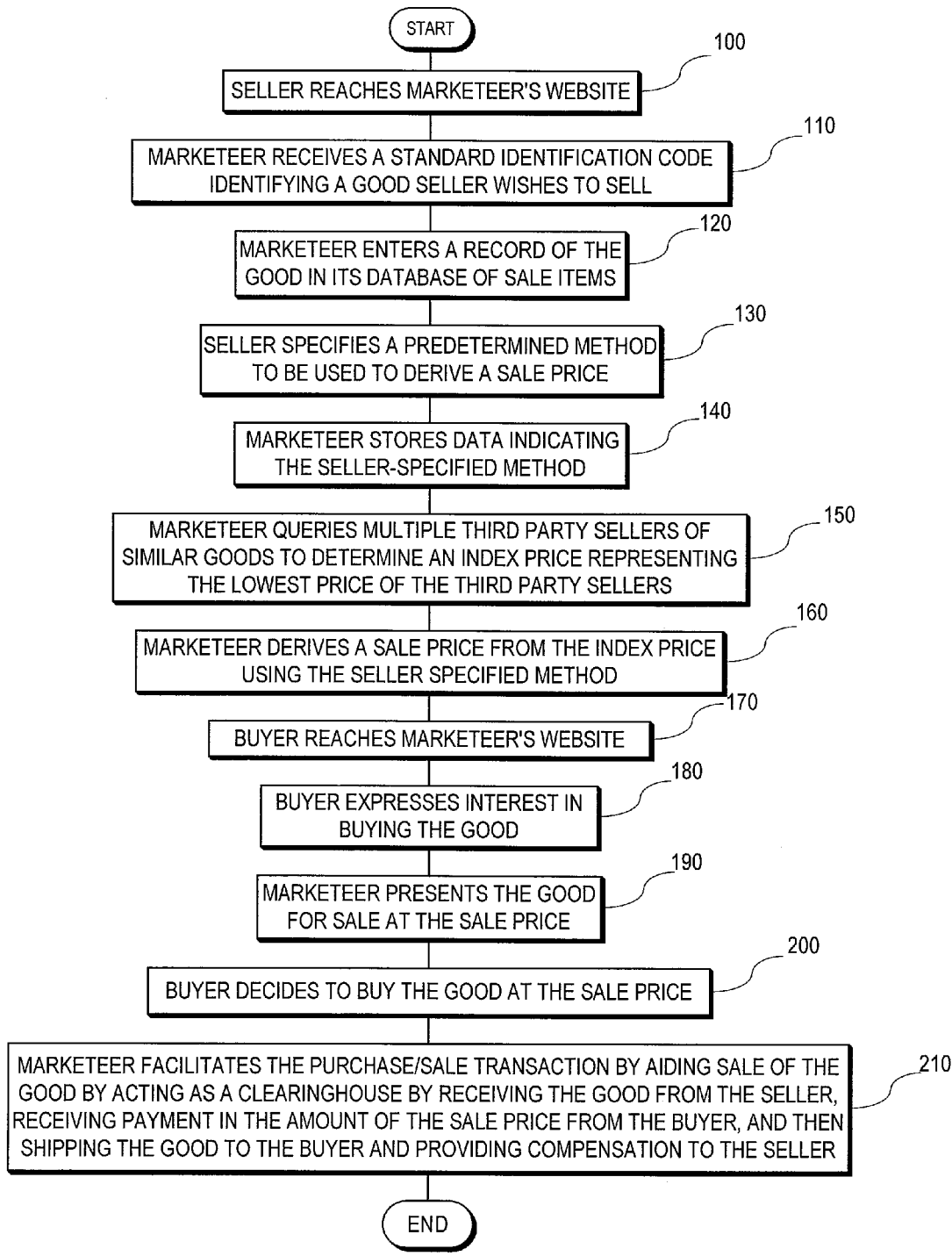
FIG. 3 is a flow diagram providing an example of a computer-implemented method for pricing and facilitating sale of an independent seller's good in accordance with the present invention.

FIG. 3 is a block diagram showing flow of an example of a computer-implemented method for pricing and facilitating sale of an independent seller's good in which the index price is determined near a time of registering the good for sale. A seller first reaches the marketeer's website, as shown at step 100. In effect, the seller is entering the marketeer's virtual marketplace. A seller may do so by visiting the marketeer's website using his buyer interface, i.e., personal computer, to access the marketeer controller via the communications network. The seller then identifies to the marketeer a good he wishes to sell, in effect, registering the good for sale with the marketeer. To do so, the seller submits a standard identification code to the marketeer, as shown at step 110. This may be achieved by the seller using his keyboard to enter the code into a field provided by the marketeer's website, as is known in the art. The standard identification code may be a universal product code (UPC) or an International Standard Book Number (ISBN), for example. The use of a standard identification code identifies the good in a manner readily identifiable by the marketeer and/or buyers. The marketeer controller stores the identification code in its memory to register the good as an item for sale by the seller, as shown at step 120. The marketeer controller may also store in its memory data provided by the seller to identify the seller as the owner of the good.

In accordance with the method, the seller does not specify a price but rather specifies a method for determining a sale price from an index price, as shown at step 130. As discussed above, the method could include a discount from a manufacturer's list price. In the preferred embodiment, the seller specifies a method including a discount from a price of a comparable new good by a certain percentage. This may be achieved, for example, by the seller's selection of an option from a menu presented by the marketeer, e.g., by selecting a button or check-box using his mouse, as is well known in the art. For example, the marketeer may present a menu of options for a 70% discount from a manufacturer's suggested retail price, a 70% discount from a price for a comparable new good, a 50% discount from a manufacturer's suggested retail price, or a 50% discount from a price for a comparable new good. The marketeer controller also stores in its memory data indicating the method specified by the seller for pricing the good, as shown at step 140. In one embodiment, the seller is also presented with an option for specifying a fixed price for the good.

The marketeer determines an index price for the good, as shown at step 150. In the preferred embodiment, determination of the index price is performed by the marketeer controller. To do so, the marketeer controller queries multiple third party vendors of comparable goods to determine their respective prices and to equate the index price to the lowest price of a group of third party vendors for a new good similar to the used good offered for sale by the seller. The querying step is performed by a shopping agent program stored in the memory of the marketeer controller. It is advantageous to use a standard product identification code, such as the UPC, to perform the query.

The marketeer then derives a sale price of the good from the index price using the method specified by the seller, as shown at step 160. This is performed by a pricing agent program stored in the memory of the marketeer controller. Preferably, the method includes a discount of the index price by approximately fifty percent to determine the sale price of the seller's good. In one embodiment, the seller is presented with the sale price and asked to confirm his desire to offer the good for sale at the sale price. After the marketeer controller has derived the sale price, it stores in its memory the sale price of the good.

At this point, the good is registered with the marketeer for sale by the seller. The marketeer has not taken possession of the good. After a period of time, a buyer enters the marketeer's marketplace by reaching the marketeer's website, as shown at step 170, using his personal computer to communicate with the marketeer controller via the communications network. The buyer may browse the marketeer's website to shop for a good. Presentation of electronic storefronts, including browsing and searching abilities is well known in the art. For example, books, music, and videos may be categorized by content or genre. Alternatively, for example, a buyer interested in a particular book may search by subject, author or title, and view an image of the cover of the book, read a description or review of the book, etc. In another embodiment, a buyer could search for an item using its standard unique ID code. Any method of categorizing, cataloging or searching may be used which enables a buyer or potential buyer to find a good for which he is looking or in which he may be interested.

If the buyer is interested in the possibility of purchasing a good, the buyer expresses interest in buying the good, as shown at step 180. The buyer may do so using any suitable method, as are well known in the art. For example, a buyer may use his mouse to select a button or click a checkbox displayed on a web page and appearing on his video monitor.

The marketeer then presents the good to the buyer for sale at the sale price, as shown at step 190. This may be achieved by transmitting to the buyer data for displaying the sale price and a description of the good on the video monitor of the buyer's personal computer.

If the buyer decides to buy the good at the sale price, as shown at step 200, he may indicate his intent to do so in a manner similar to that described above with reference to expression of his interest in purchasing the good. The marketeer then facilitates the sale transaction between the buyer and the seller, as shown at step 210. This may be achieved in a variety of ways. For example, the marketeer may refer the parties to an intermediary clearinghouse or escrow agent or may itself act as the intermediary. In the preferred embodiment, the buyer transmits identification information to the marketeer controller which the marketeer controller stores in its memory and the marketeer controller then identifies the seller to the buyer and the buyer to the seller so that they may complete the sale transaction.

This arrangement works particularly well for readily identifiable, fungible, durable goods which have been pre-owned or used since the goods are readily identified by both the buyer and the seller, all goods, offer similar value to the consumer, and the fact that the good has been used does not significantly deplete the value of the good to the consumer.

In this manner, fair prices are ensured to buyers and sellers by allowing a price to be set as a function of an independent, third party vendor's price. Advantageously, the marketeer is not required to maintain an expensive inventory of goods, buyers do not have to shop tirelessly to get good values, and sellers don't have to monitor prices of similar goods. Additionally, in one embodiment, the buyer is ensured a lowest price for a good since the sale price is set using the seller-determined method at a discount from the lowest price of a seller or group of sellers of a comparable new good at the time of the sale, particularly when the index price is for a new good and the sale price is for a used good.

In one embodiment, goods in addition to those listed or registered for sale by sellers at the marketeer's website are presented by the marketeer for browsing by a buyer. Information concerning such additional goods may be retrieved from a database accessible to the marketeer controller. In one embodiment, the marketeer refers the buyer to a third party vendor if the buyer wishes to purchase the good and the good sought by the buyer is not listed for sale with the marketeer, e.g., by presenting a link to the vendor's website. In another embodiment, the seller is presented with opportunities to select a different pricing option and to thereby change the sale price or to remove the good from the marketeer's list of registered goods after registering the good for sale.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention.

Accordingly, the foregoing description is by way of example only, and not limiting. The invention is limited only as defined in the following claims and equivalents thereto.

What is claimed is:

1. A method for facilitating sales of goods offered for sale by independent sellers, the method being computer-implemented by a marketeer's marketeer controller computer capable of communicating via a communications network, the marketeer controller computer including a microprocessor and a memory operatively connected to the microprocessor, the method comprising:

the marketeer controller computer receiving data from an independent seller, the data having been transmitted in electronic form via the communications network, the data comprising a standard identification code identifying a tangible good, the standard identification code having been provided by the independent seller as typed input keyed into a website interface of a computerized communications device, the standard identification code having been previously established for standardized use in industry and identifying the good in a manner readily-identifiable by the marketer controller computer, the standard identification code being one of an industry-standard universal product code (UPC) and an industry-standard International Standard Book Number (ISBN), the standard identification code being physically attached to the tangible good; and in response to receipt of the standard identification code identifying the tangible good, the marketeer controller computer storing in the memory data identifying the tangible good, said storing adding the tangible good to a list of goods registered for sale with the marketer controller computer;

whereby the tangible good identified by the standard identification code and offered for sale by the seller is thereby made available to be presented for sale by the marketeer controller computer;

the marketeer controller computer subsequently:

retrieving from a database data stored in association with the tangible good identified by the standard identification code provided by the seller, the retrieved data relating to the tangible good but not being readily identifiable from viewing of the standard identification code, the retrieved data comprising one of a textual description of the tangible good and an image of the tangible good; and the marketeer controller computer presenting the tangible good for sale by transmitting data for displaying to a buyer the retrieved data relating to the tangible good and a sale price at which the buyer may purchase the tangible good.

2. The method of claim 1, further comprising the marketeer controller computer setting a sale price at which the buyer may purchase the good, the good being offered for sale by the seller at the sale price, said setting being performed near a time of the sale of the good to the buyer, the sale price being set after the buyer's search for the good.

3. The method of claim 2, wherein the marketeer controller computer setting a sale price comprises the marketeer controller computer querying multiple vendor controller computers by the marketeer controller computer transmitting data via the communications network to determine multiple respective vendor's prices for a comparable good identified by the standard identification code, and deriving the sale price for the seller's good from the vendor's prices for the comparable good by discounting a lowest price of the multiple vendor's prices using a predetermined method.

4. The method of claim 2, further comprising the marketeer aiding sale of the good by acting as a clearinghouse by receiving the good from the seller, receiving payment in the amount of the sale price from the buyer, and then shipping the good to the buyer and providing compensation to the seller.

5. The method of claim 4, wherein the marketeer retains a portion of the sale price.

6. The method of claim 2, further comprising the marketeer controller computer querying a vendor controller computer by the marketer controller computer transmitting data via the communications network to determine a vendor's price for a comparable good identified by the standard identification code;

wherein setting a sale price for the good comprises at least the marketeer controller computer deriving the sale price for the seller's good from the vendor's price for the comparable good by discounting the vendor's price using a predetermined method, said querying being performed before said setting of the sale price.

7. The method of claim 2, wherein setting the sale price for the good comprises the marketeer controller computer referencing a database to identify a sales price for the good.

8. The method of claim 7, wherein the standard identification code is used to identify the sale price.

9. The method of claim 7, wherein the database is stored in the memory of the marketeer controller computer.

10. The method of claim 7, wherein the database is stored by a third party vendor of goods, the method further comprising the marketeer controller computer querying a vendor's controller computer by transmitting data via the communications network to determine the vendor's price for a comparable good identified by the standard identification code;

wherein setting a sale price for the good comprises at least deriving the sale price for the seller's good from the vendor's price for the comparable good by discounting the vendor's price using a predetermined method.

11. The method of claim 1, wherein the marketeer controller computer storing data in the memory comprises entering a record of the good in the memory of the marketeer controller to register the good with a marketeer as an item for sale by the seller.

12. The method of claim 11, wherein the UPC comprises a plurality of numeric characters and no alphabetic characters.

13. The method of claim 11, wherein the ISBN comprises a plurality of numeric characters and no alphabetic characters.

14. The method of claim 1,
wherein said retrieving and said presenting are performed after the buyer's search for the good.

15. A method for facilitating sales of goods offered for sale by independent sellers, the method being computer-implemented by a marketeer's marketeer controller computer capable of communicating via a communications network, the marketeer controller computer including a microprocessor and a memory operatively connected to the microprocessor, the method comprising:

the marketeer controller computer receiving data from an independent seller, the data having been transmitted in electronic form via the communications network, a standard identification code identifying a tangible good, the standard identification code having been provided by the independent seller as typed input keyed into a website interface of a communications device, the standard identification code comprising a numeric UPC or ISBN code previously established for standardized use in industry, the standard identification code being physically attached to the tangible good;

the marketeer controller computer storing data in the memory to add the tangible good to a list of goods registered for sale with a marketeer; and in response to a particular buyer's search for the tangible good, the marketeer controller computer retrieving from a database data associated with the tangible good identified by the standard identification code provided by the seller, the database being stored in the memory of the marketeer controller;

the marketeer controller computer querying a vendor's controller computer by transmitting data in electronic form via the communications network to determine the vendor's price for a comparable good identified by the standard identification code;

the marketeer controller computer deriving a sale price at which the particular buyer may presently purchase the seller's tangible good, the sale price being derived from the vendor's price for the comparable good by the marketeer controller computer discounting the vendor's price, the tangible good being offered for sale by the seller at the sale price; and the marketeer controller computer presenting the tangible good for sale by displaying to the buyer the data retrieved from the database, the retrieved data relating to and identifying characteristics of the tangible good, the retrieved data not being identifiable when observing only the standard identification code provided by the seller;

whereby the seller identifies the tangible good to the marketer controller computer by providing a UPC or ISBN code, and whereby the tangible good is presented for sale to the buyer by displaying on a video monitor the retrieved data, the retrieved data being information that has not been provided by the seller and that is not readily identifiable when observing the standard identification code provided by the seller.

16. A method for facilitating sales of goods offered for sale by independent sellers, the method being computer-implemented by a marketeer's marketeer controller computer capable of communicating via a communications network, the marketeer controller computer including a microprocessor and a memory operatively connected to the microprocessor, the method comprising:

the marketeer controller computer receiving from an independent seller a standard identification code identifying the good in a readily-identifiable manner, the standard identification code having been typed by the independent seller into a website interface of a computerized communications device and transmitted in electronic form via the communications network to the marketer controller computer; and in response to receipt of the standard identification code identifying the good, the marketeer controller computer storing in the memory data adding the good to a list of goods registered for sale with the marketer controller computer;

whereby the good identified by the standard identification code and offered for sale by the seller is thereby made available to be presented for sale by the marketeer controller computer;

the marketeer controller computer subsequently:
retrieving from a database data stored in association with the good identified by the standard identification code provided by the seller, the retrieved data relating to the good but not being readily identifiable from viewing of the standard identification code, the retrieved data comprising an image of the good;

determining a sale price at which a buyer may purchase the good; and presenting the good for sale by transmitting data for displaying for displaying on a video monitor, to a buyer, the retrieved data relating to the good and the sale price at which the buyer may purchase the good.

17. The method of claim 16, wherein determining the sale price comprises:
the marketeer controller computer querying a vendor controller computer by the marketer controller computer transmitting data via the communications network to determine a vendor's price for a comparable good identified by the standard identification code; and deriving the sale price for the seller's good from the vendor's price for the comparable good by discounting the vendor's price using a predetermined method.

18. The method of claim 17, wherein the marketeer retains a portion of the sale price.

19. The method of claim 18, wherein the marketeer controller computer storing data in the memory comprises entering a record of the good in the memory of the marketeer controller to register the good with the marketeer as an item for sale by the seller.

20. The method of claim 19, further comprising the marketeer aiding sale of the good by acting as a clearinghouse by receiving the good from the seller, receiving payment in the amount of the sale price from the buyer, and then shipping the good to the buyer and providing compensation to the seller.

21. The method of claim 16, wherein the standard identification code comprises a UPC code.

22. The method of claim 16, wherein the standard identification code comprises an ISBN code.

23. A method for facilitating sales of goods offered for sale by independent sellers, the method being computer-implemented by a marketeer's marketeer controller computer capable of communicating via a communications network, the marketeer controller computer including a microprocessor and a memory operatively connected to the microprocessor, the method comprising:

the marketeer controller computer receiving from an independent seller a standard identification code identifying the good in a readily-identifiable manner, the standard identification code having been typed by the independent seller into a website interface of a computerized communications device and transmitted in electronic form via the communications network to the marketer controller computer; and in response to receipt of the standard identification code identifying the good, the marketeer controller computer storing in the memory data adding the good to a list of goods registered for sale with the marketer controller computer;

whereby the good identified by the standard identification code and offered for sale by the seller is thereby made available to be presented for sale by the marketeer controller computer;

in response to a buyer's search for the good, the marketeer controller computer subsequently:
retrieving from a database data stored in association with the good identified by the standard identification code provided by the seller, the retrieved data relating to the good but not being readily identifiable from viewing of the standard identification code, the retrieved data comprising one of a textual description of the good and an image of the good;

querying multiple vendor controller computers by the marketeer controller computer transmitting data via the communications network to determine multiple respective vendors' prices for a comparable good identified by the standard identification code; and deriving the sale price for the seller's good from the vendors' prices for the comparable good by discounting a lowest price of the multiple respective vendors' prices using a predetermined method; and presenting the good for sale by transmitting data for displaying for displaying on a video monitor, to a buyer, the retrieved data relating to the good and the sale price at which the buyer may purchase the good.

24. The method of claim 23, wherein the marketeer controller computer storing data in the memory comprises entering a record of the good in the memory of the marketeer controller to register the good with the marketeer as an item for sale by the seller.

25. The method of claim 23, further comprising the marketeer aiding sale of the good by acting as a clearinghouse by receiving the good from the seller, receiving payment in the amount of the sale price from the buyer, and then shipping the good to the buyer and providing compensation to the seller.

26. The method of claim 25, wherein the marketeer retains a portion of the sale price.

27. The method of claim 23, wherein the marketeer controller computer storing data in the memory comprises entering a record of the good in the memory of the marketeer controller to register the good with the marketeer as an item for sale by the seller.

28. The method of claim 23, further comprising the marketeer aiding sale of the good by acting as a clearinghouse by receiving the good from the seller, receiving payment in the amount of the sale price from the buyer, and then shipping the good to the buyer and providing compensation to the seller.

29. The method of claim 28, wherein the marketeer retains a portion of the sale price.

30. The method of claim 23, wherein the standard identification code comprises a UPC code.

31. The method of claim 23, wherein the standard identification code comprises an ISBN code.

* * * * *